United States Patent [19]

Haydu et al.

[11] 4,014,409
[45] Mar. 29, 1977

[54] MULTI-BRAKE SHOE MEANS FOR A MULTI-BRAKING SURFACE BRAKED ASSEMBLY

[75] Inventors: Andrew G. Haydu, Swisshelm Park; Robert B. Morris, North Huntingdon, both of Pa.

[73] Assignee: Westinghouse Air Brake Company, Wilmerding, Pa.

[22] Filed: June 17, 1975

[21] Appl. No.: 587,861

[52] U.S. Cl. .................................. 188/58; 188/79
[51] Int. Cl.² ....................................... F16D 49/16
[58] Field of Search ................ 188/58, 79, 52, 53, 188/204 R, 238

[56] References Cited

UNITED STATES PATENTS

| 2,042,445 | 5/1936 | Eksergian | 188/79 |
| 2,191,821 | 2/1940 | Down | 188/58 |
| 3,536,168 | 10/1970 | Newstead | 188/79 |

*Primary Examiner*—Duane A. Reger
*Attorney, Agent, or Firm*—W. F. Poore; R. W. McIntire, Jr.

[57] ABSTRACT

This invention relates to a braking apparatus wherein the heat absorbing mass of a rotating braked element, such as a vehicle wheel, is increased by securing to such as each wheel of a vehicle, a brake drum, the peripheries of the wheels and drums constituting braking surfaces against which a plurality of brake shoes are pressed during a brake application by a movable member between which and each pair of the plurality of brake shoes there is interposed an equalizer lever that is pivoted intermediate its ends on the movable member, each equalizer lever being thereby rockable relative to the movable member to enable each one of the corresponding pair of brake shoes to transmit substantially the same braking force to the braking surface braked thereby notwithstanding the rate of wear of either one of any pair of brake shoes exceeding that of the other brake shoes.

4 Claims, 1 Drawing Figure

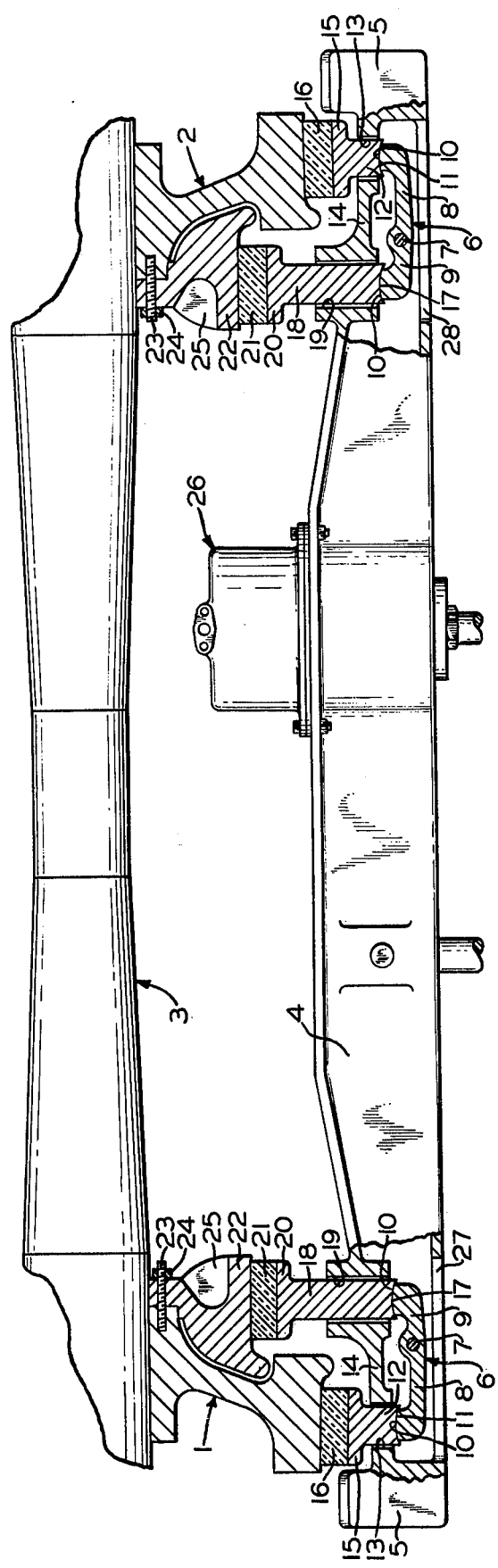

MULTI-BRAKE SHOE MEANS FOR A MULTI-BRAKING SURFACE BRAKED ASSEMBLY

BACKGROUND OF THE INVENTION

In the copending application of Robert B. Morris, Ser. No. 587,600, filed June 6, 1975, and assigned to the assignee of the present application, there is shown and described a brake apparatus that embodies a plurality of brake shoes each of which, during a brake application, is pressed against a corresponding braking surface by a movable member between which and each pair of brake shoes there is interposed a mechanism that includes either a lever pivoted intermediate its ends on the movable member with one of a pair of brake shoes secured to each end of each lever, or a plurality of encased spherical members.

With either of the above-mentioned mechanisms interposed between a pair of brake shoes and the movable member, when the rate of wear of either one of the pair of brake shoes exceeds that of the other, the total force applied to other brake shoe remains the same. However, the force applied to the portion of the brake shoe having the lower rate of wear adjacent one edge thereof is greater than the force applied to that portion of this brake shoe adjacent its other edge. In other words, the braking force is not uniformly distributed over the entire braking surface of the brake shoe so that the braking surface of the brake shoe tends to become tilted with respect to the peripheral surface of the corresponding wheel or brake drum. It is apparent that this tendency of the braking surface of the brake shoe to become tilted with respect to the peripheral surface of the corresponding wheel or brake drum will cause the braking surface of that portion of the brake shoe adjacent one edge thereof and subject to the higher braking force to wear away faster than the remainder of the braking surface of this shoe. Of cource such uneven wear of the braking surface of a brake shoe is undesirable.

Accordingly, it is the general purpose of this invention to provide a novel brake apparatus wherein the mass, and, therefore, the heat sink, of a railway vehicle wheel is increased by securing a brake drum to the side of the wheel, or to the axle on which the wheel is mounted, and applying a braking force from a movable member to the braking surfaces constituted by the peripheries of both the wheel and the drum via a multi-brake shoe means that comprises a plurality of brake shoes. Between each pair of brake shoes and the movable member there is interposed a lever pivoted intermediate its ends on the movable member with its respective opposite ends in sliding abutting contact with shanks that extend from one side of brake heads to the other side of which the brake shoes are secured whereby, upon movement of the movable member in the direction of the wheel and brake drum, these brake shoes, without a tendency to become tilted with respect to the corresponding braking surface, transmit substantially equal braking forces to the peripheral braking surfaces on the wheel and drum notwithstanding the rate of wear of one brake shoe exceeding that of the other.

Summary of the Invention

According to the present invention, the mass, and therefore the heat sink, of a railway vehicle wheel is increased by the addition of a brake drum suitably secured to the side of the wheel, or pressed on the axle of the wheel, the respective peripheries of the wheel and drum providing braking surfaces against which a pair of brake shoes are pressed during a brake application by a movable member, such as, for example, a brake beam, between which member and the brake shoes that are carried on one side of brake heads from the opposite side of which extends a shank, there is interposed a lever. This lever is rockably mounted intermediate its ends on a fulcrum member that is anchored on the movable member. Moreover, the lever has its respective opposite ends so formed as to enable sliding abutting contact with the end of the shank extending from the opposite side of the corresponding brake-shoe-carrying brake head through a guide opening provided therefor in the movable member which may be moved in the direction of the wheel to bring the pair of brake shoes into braking contact with their corresponding braking surfaces without tilting of either shoe upon one shoe wearing away faster than the other.

In the accompanying drawing:

The single FIGURE is a plan or top view, partly in section, of a novel brake apparatus wherein two pair of brake shoes are moved into braking engagement with the respective peripheries of a pair of wheels and brake drums secured to the respective wheels via a pair of levers pivotally mounted on a brake beam.

Referring to the drawing, the reference numerals 1 and 2 designate respectively the wheels secured at opposite ends of of an axle 3 which may constitute one axle of a two-axle four-wheel railway vehicle truck.

The tread of the wheels 1 and 2 forms a peripheral annular braking surface thereby enabling the mass of the respective wheel to constitute a heat sink in which heat energy may be stored and from which heat may be dissipated by radiation as the wheel rotates at a high speed while a railway vehicle travels along a track.

A brake beam 4 may comprise one of a pair of brake beams of a brake rigging for a two-axle four-wheel railway vehicle truck such as, for example, the brake rigging shown and described in U.S. Pat. No. 2,958,398, issued Nov. 1, 1960 to George K. Newell, and assigned to the assignee of the present invention. This pair of brake beams is symmetrically arranged on opposite sides of a truck bolster (not shown) and are movable supported at each end on the side frame members (not shown) of the railway vehicle truck.

The brake beam 4 may be in the form of a casting that in cross section has the shape of a standard channel, such as a U-channel, this channel having an upper and a lower flange which are connected by a web that is integral therewith. At each end of the brake beam 4, a guide foot 5, in the form of a flat L-shaped member, has one leg thereof cast integral with the flanges at this end of the brake beam. The other leg of each guide foot 5 is slidably supported in a grooved wear plate and guide member (not shown), this wear plate and guide member being secured to a truck side frame (not shown). The wear plate and guide members and guide feet serve to support the brake beam 4 at the proper height above the rails, (that is somewhat below the horizontal diameter of the wheels) the groove in the wear plate and guide members being at a slight angle to the horizontal to permit bodily movement of the brake beam 4 in a direction radially of the associated wheels 1 and 2 when a brake application is effected.

An equalizer lever 6 is disposed between the upper and lower flanges of the brake beam 4 adjacent each end thereof and on the inboard side of the respective guide foot 5 and is pivotally mounted on, such as, a headed pin 7 that extends through suitable coaxial bores provided therefor in these flanges and the respective equalizer lever 6.

As shown in the drawing, each of the equalizer levers 6 comprises two arms 8 and 9, the arm 8 being longer than the arm 9, it being understood that these arms may be of any desired length, or of the same length if so desired. The end of each of the arms 8 and 9 of each equalizer lever 6 is provided with an arcuate or convex surface 10. This convex surface 10 of the longer arm 8 of each equalizer levers 6 abuts a concave surface 11 formed at one end of a shank 12 that extends with appreciable clearance through an opening 13 provided therefor in a wall 14 that connects the upper and lower flanges of the brake beam 4 for a portion of their length extending inward from the corresponding guide foot 5. The other end of the shank 12 is formed integral with the back of a brake head 15 the front of which has secured thereto by any suitable means a brake shoe 16. This brake shoe 16 may be constructed of some satisfactory composition friction material for effecting a braking action on a braking surface constituted by the tread of the wheel 1 or 2 when forced against the corresponding braking surface on the respective wheel.

The convex surface 10 of the shorter arm 9 of each equalizer lever 6 abuts a concave surface 17 formed at one end of a shank 18 that extends with appreciable clearance through a second opening 19 provided therefor in the wall 14. The other end of this shank 18 is formed integral with the back of a brake head 20 the front of which has secured thereto by any suitable means a brake shoe 21. Like the brake shoe 16, the brake shoe 21 may be constructed of some satisfactory composition friction material for effecting a braking action on a braking surface constituted by the peripheral surface of a split-type finned brake drum 22 that may be secured to the inboard side of the respective wheels 1 and 2 by a plurality of studs 23 and nuts 24, only one of each for each wheel being shown in the drawing, or pressed on the axle 3 so as to abut the inboard side of the wheel, when this shoe 21 is forced against the peripheral surface of the respective brake drum 22.

The peripheral surface of each brake drum 22, when a brake shoe 21 is forced or pressed thereagainst, enables the mass of the respective brake drum to constitute a heat sink in which heat energy may be stored and from which heat may be dissipated by radiation from a plurality of arcuately arranged spaced-apart fins 25, only one of which appears in the drawing, that are formed integral with the brake drum 22 as this drum rotates.

When a pair of brake beams, each like the brake beam 4 shown in the drawing, constitutes the two brake beams of a brake rigging, such as the brake rigging shown and described in U.S. Pat. No. 2,958,398 issued Nov. 1, 1960 to George K. Newell, and assigned to the assignee of the present invention, the brake shoes 16 and 21 carried by these two brake beams are operated into and out of braking engagement with the peripheral surface of the brake drums 22 and wheels 1, 2 by means of a pair of fluid pressure motors or brake cylinders 26, one constructed and secured to each brake beam in the same manner as the brake cylinder 13 shown and described in the hereinbefore-mentioned copending application of Robert B. Morris.

When fluid under pressure is simultaneously supplied to the pressure chamber (not shown) in each brake cylinder 26 in the manner described in the above-mentioned copending application of Robert B. Morris, it is effective to move the pistons (not shown) within the brake cylinders 12 and these cylinders 13 in opposite directions and likewise the two brake beams in opposite directions. As these two brake beams move in opposite directions, the brake shoes 16 and 21 carried by these two brake beams are brought into braking contact with the peripheral surface of the corresponding wheels 1, 2 and brake drums 22 to produce substantially equalized forces of application of these brake shoes to the corresponding wheels 1, 2 and brake drums 22.

When it is desired to release the brake application, the fluid under pressure supplied to the pressure chamber of both brake cylinders 26 is vented therefrom in the manner described in the above-mentioned copending application of Rober B. Morris.

Now let it be supposed that, while a brake application is in effect, one of the brake shoes begins to wear away faster than the others.

First, let it be supposed that the brake shoe 16 shown on the right-hand side of the drawing wears away faster than the right-hand brake show 21. As this brake shoe 16 begins to wear way faster than the above-mentioned brake shoe 21, the force transmitted from the brake beam 4 to the right-hand pin 7 is in turn transmitted to the right-hand equalizer lever 6 to cause this lever to rock counterclockwise with sliding action occurring along the line of contact between the arcuate surface 10 at the end of the arm 9 of this lever 6 and the concave surface 17 formed at the end of the shank 18 of brake head 20. This counterclockwise rocking of the lever 6 is effective to maintain the brake shoe 16 in contact with the peripheral tread surface of the wheel 2.

Furthermore, it should be noted that as the right-hand equalizer lever 6 is rocked counterclockwise in the manner just described, the arcuate surface 10 formed at the end of the arm 8 of this lever 6 slides along the concave surface 11 formed at the end of the shank 12. Therefore, since the arcuate surface 10 at the end of arm 9 slides along the concave surface 17 at the end of shank 18 and the arcuate surface 10 at the end of arm 8 slides along the concave surface 11 at the end of shank 12 as this right-hand equalizer lever 6 is rocked counterclockwise, there is no tendency for the braking surface of the brake shoe 21 to be tilted with respect to the braking surface constituted by the peripheral surface of the brake drum 22, nor is there any tendency for the braking surface of the brake shoe 16 to be tilted with respect to the braking surface constituted by the tread surface of the wheel 2.

Consequently, the force transmitted from the pin 7 through the right-hand equalizer lever 6 to the two shoes 16 and 21 will now press each shoe against its corresponding braking surface with substantially the same force being transmitted by each shoe to the braking surface against which it is pressed notwithstanding shoe wear.

In view of the foregoing, it is apparent that substantially the same braking force is transmitted by each of the brake shoes 16 and 21 to its corresponding braking surface as the brake shoe 16 wears away, without any tendency of either shoe to be tilted with respect to its corresponding braking surface, as was the case prior to the brake shoe 16 beginning to wear away.

Now let it be supposed that the brake shoe 21 shown on the right-hand side of the drawing wears away faster than the right-hand brake shoe 16. As this brake shoe 21 begins to wear away faster than the brake shoe 16, the force transmitted from the brake beam 4 to the right-hand pin 7 is in turn transmitted to the right-hand equalizer lever 6 to cause this lever 6 to rock clockwise with sliding action occurring along the line of contact between the arcuate surface 10 at the end of the arm 8 of this lever 6 and the concave surface 11 formed at the end of the shank 12 of brake head 15. This clockwise rocking of the lever 6 is effective to maintain the brake shoe 21 in contact with the peripheral surface of the brake drum 22.

Moreover, it should be noted that as the right-hand equalizer lever 6 is rocked clockwise in the manner just described, the arcuate surface 10 formed at the end of the arm 9 of this lever 6 slides along the concave surface 17 formed at the end of the shank 18. Therefore, since the arcuate surface 10 at the end of arm 8 slides along the concave surface 11 at the end of the shank 12 and the arcuate surface 10 at the end of arm 9 slides along the concave surface 17 at the end of shank 18 as the right-hand equalizer lever 6 is rocked clockwise, there is not tendency for the braking surface of the brake shoe 16 to be tilted with respect to the braking surface constituted by the tread surface of the wheel 2, nor is there any tendency for the braking surface of the brake shoe 21 to be tilted with respect to the braking surface constituted by the periphery of the brake drum 22.

Consequently, the force transmitted from the pin 7 through the right-hand equalizer lever 6 to the two shoes 21 and 16 will now press each shoe against its corresponding braking surface with substantially the same force being transmitted by each shoe to the braking surface against which it is pressed.

In view of the foregoing, it is apparent that substantially the same braking force is transmitted to each of the brake shoes 16 and 21 as the brake shoe 21 wears away as was the case prior to this brake shoe 21 beginning to wear away.

It will be observed from the drawing that the length of the arm 8 of each equalizer lever 6 is somewhat longer than the length of the arm 9 of these levers. It should be understood that the braking force transmitted via the shorter arm is greater than that transmitted by the longer arm. Therefore, any desired ratio of the forces transmitted by the two brake shoes may be obtained by proper selection of the length of the arms of the equalizer levers, or if it is desired that each brake shoe transmit the same braking force, the length of each arm is made equal to the length of the other.

Since brake horsepower is a function of the braking force applied to a rotating element, and the temperature rise in the rotating element increases as the brake horsepower applied thereto increases, it is apparent tht the heat energy stored in and dissipated from the rotating mass constituting either the wheel or the brake drum will be a preselected ratio of the heat energy stored in and dissipated from the rotating mass constituting the other.

Accordingly, when the total brake horsepower per wheel of a railway vehicle truck has been determined and the mass of the wheel to be used on the truck is known, this, of course, being determined from the size, diameter and kind of wheel used, the amount of brake horsepower that can be converted from mechanical energy to heat energy and absorbed by this wheel without overheating can be determined. The length of the arms 8 and 9 of the equalizer lever 6 and the size of the brake drum 22 may then be so selected that the remaining amount of the total brake horsepower per wheel, when converted from mechanical energy into heat energy, can be stored in and dissipated by radiation from the brake drum 22 without the resulting temperature of this brake drum 22 being in excess of a safe limit.

What has been said above regarding the right-hand equalizer lever 6, the brake shoes 16 and 21 associated therewith, the wheel 2 and the brake drum 22 secured thereto applies equally to the left-hand equalizer lever 6, the brake shoes associated therewith, the wheel 1 and the brake drum secured to this wheel. Therefore, a detailed description of the left-hand equalizer lever 6, the brake shoes associated therewith, and the wheel 1 is believed to unnecessary.

It will be noted that it is not necessary to use a slack adjuster with a brake rigging comprising a pair of brake beams constructed like the brake beam 4 shown in the drawing for the same reason as set forth in the hereinbefore-mentioned copending application of Robert B. Morris for the brake rigging disclosed therein.

It will be further noted that the brake beam 4 is provided with windows 27 and 28 each inboard of one of the guide feet 5. These windows 27 and 28 provide for the insertion and removal of the equalizer levers 6 from the position in which they are rockably mounted on the brake beam 4 by the pins 7.

Having now described the invention what we claim as new and desire to secure by Letters Patent, is:

1. Multi-brake shoe means for transmitting braking force to multi-braking surfaces formed on an element to be braked, said multi-brake shoe means comprising:
   a. a member movable toward and away from the multi-braking surfaces on the element to be braked,
   b. a plurality of brake heads carried by said movable member, each of said brake heads having a shank extending from one side thereof the end of which shank is provided with a concave surface.
   c. a plurality of brake shoes, each having a braking face via which a braking force is transmitted to a corresponding braking surface when moved into braking contact therewith and being carried on the other side of one of said plurality of brake heads, and wherein the improvement comprises:
   d. a pair of levers, each of which is so pivotally mounted intermediate its ends on said movable member as to form two arms, the end of each arm being provided with an arcuate surface for sliding abutting contact with the concave surface on the end of the shank of a corresponding one of said plurality of brake heads whereby the braking face of the brake shoe carried by each brake head is maintained in contact with its corresponding braking surface without tilting with respect thereto notwithstanding the rate of wear of any one of said plurality of brake shoes exceeding that of another.

2. Multi-brake shoe means, as recited in claim 1, further characterized in that said movable member comprises a brake beam having an upper and a lower flange connected by a web having therein a pair of spaced-apart windows through each of which one of said pair of levers may be inserted and removed from a position between said upper and lower flanges in which the respective lever is pivotally mounted intermediate its ends on said brake beam.

3. Multi-brake shoe means, as recited in claim 1, further characterized in that one arm of said two arms of each of said pair of levers is longer than the other arm.

4. Multi-brake shoe means, as recited in claim 1, further characterized in that said two arms of each of said pair of levers are of equal length.

* * * * *